J., W. H., C. H. & A. DAY.
MACHINERY OR APPARATUS FOR FORMING OR MAKING PAPER BAGS.
APPLICATION FILED MAY 23, 1908.

942,715.

Patented Dec. 7, 1909.

Witnesses:—
William Sadler
Annie Park

Inventors
Job Day
William Henry Day
Charles Herbert Day
Albert Day
by W. Fairburn Hart
Attorneys J., W. H., C. H. & A. DAY.
MACHINERY OR APPARATUS FOR FORMING OR MAKING PAPER BAGS.
APPLICATION FILED MAY 23, 1908.

942,715.

Patented Dec. 7, 1909.
9 SHEETS—SHEET 7.

Witnesses:—
William Sadler
Annie Park

Inventors.
Job Day
William Henry Day
Charles Herbert Day
Albert Day
by H. Fawburn Hart
Attorney

J., W. H., C. H. & A. DAY.
MACHINERY OR APPARATUS FOR FORMING OR MAKING PAPER BAGS.
APPLICATION FILED MAY 23, 1908.

942,715.

Patented Dec. 7, 1909.
9 SHEETS—SHEET 9.

UNITED STATES PATENT OFFICE.

JOB DAY, WILLIAM HENRY DAY, CHARLES HERBERT DAY, AND ALBERT DAY, OF LEEDS, ENGLAND.

MACHINERY OR APPARATUS FOR FORMING OR MAKING PAPER BAGS.

942,715.     Specification of Letters Patent.     Patented Dec. 7, 1909.

Application filed May 22, 1908. Serial No. 434,575.

*To all whom it may concern:*

Be it known that we, JOB DAY, WILLIAM HENRY DAY, CHARLES HERBERT DAY, and ALBERT DAY, residing, respectively, at 54 Sholebroke avenue, Chapeltown Road, Leeds, in the county of York and Kingdom of England; Beulah House, South Milford, in the said county of York; 22 St. John's Terrace, Belle Vue Road, Leeds aforesaid, and 36 Delph Lane, Leeds, aforesaid, have invented new and useful Improvements in or Relating to Machinery or Apparatus for Forming or Making Paper Bags, of which the following is a specification.

This invention relates to improvements in paper bag forming machines of the class in which a sheet of paper after being cut to size is placed over a folding box and wrapped, with the longitudinal edges over one another, around one of a series of diagonally divided "formers" mounted upon an intermittently rotating rising and falling shaft, after which the end is folded on to the end of the "former" in what has been termed either the "rectangular" or the "square" shape, such as are described in United States of America patent specification No. 755,754.

The object of the present invention is, first, to provide means for supplying a plain or printed sheet of paper, or lead or cardboard, which forms the outside of the bag, to the folding box or mold of the machine, with means for preventing the sheet from adhering to the gummer; second, to provide a suitable gumming apparatus with automatic means applied thereto so that if a sheet fails to be fed into the required position, the gumming apparatus is thrown out of gear and will not come in contact with the table; third, means for feeding the inside sheets of plain or ordinary paper, or intermediate, such as lead paper, one or both, forming the lining, and placing them in position on the outer paper; fourth, providing means for creasing or stiffening the lining which is formed either from rolls or separate sheets; fifth, an arrangement for insuring of the end of the bag being secured in position by the adhesive matter; and, sixth, the mechanism for creasing, closing, flattening, and completely gusseted or self-opening bags.

The above objects are attained by mechanism illustrated in the accompanying drawings, in which:—

Fig. 37ª. is a part plan of lining sheet guide plate; Fig. 37ᵇ. an end elevation of the same; Fig. 37ᶜ. a plan of the guide plate.

Like parts are marked with similar letters and numerals of reference in all the views.

The framework of the machine comprises a table $a$ mounted upon standards $b, b$, and provided with bearings for the reception of the driving shaft $c$, a cam shaft $d$, a vertical shaft $e$, and "former" actuating shaft $f$. The standards are connected by stays $g, g$. On the driving shaft $c$ is mounted and fixed respectively fast and loose pulleys $h, i$, and fly wheel $j$. The end of the driving shaft is carried by bracket $k$. $l$ is belt shipping apparatus of any usual and ordinary construction. The driving shaft $c$ is connected by spur gearing $m$ to the cam shaft $d$, and the last named shaft is connected by a double spur gearing $n, o$, to the shaft $f$; and the vertical shaft $e$ is connected to shaft $f$ by miter gearing $p$.

Figures 5, 11, 12, 13, 14:
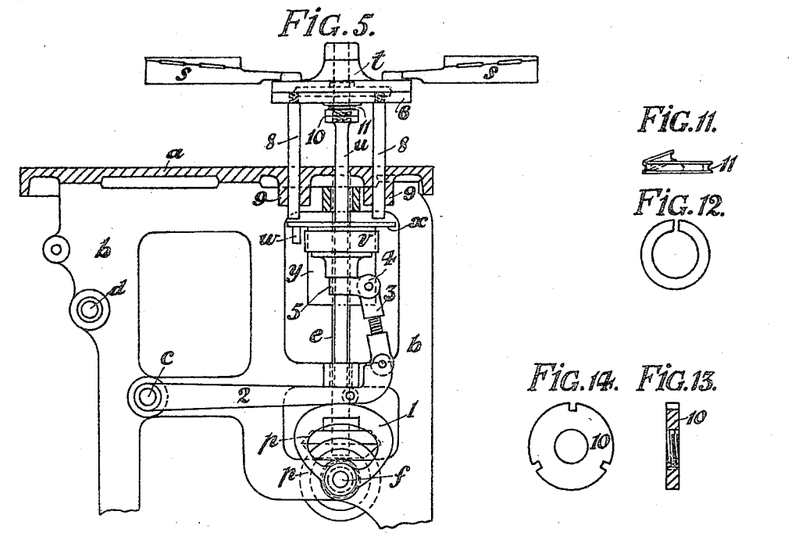
Fig. 5. a part sectional elevation of "formers" and means for rotating, raising, lowering, and breaking the same.
Fig. 11. an elevation of a "Grover" washer for use with the brake disk.
Fig. 12. a plan of the same.
Fig. 13. a sectional elevation of lock nut.
Fig. 14. a plan of the same.
Figure 6:
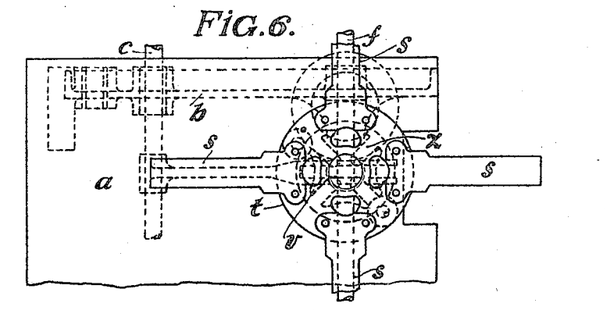
Fig. 6. a plan of the same.
Figure 7:
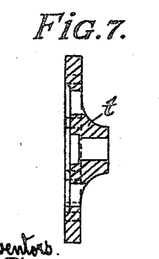
Fig. 7. a sectional elevation of the upper brake disk.
Figure 8:
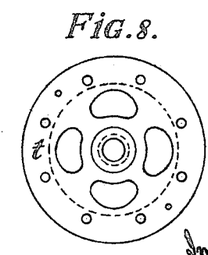
Fig. 8. a plan of the same.
Figure 9:
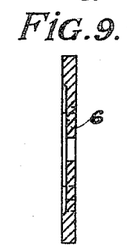
Fig. 9. a sectional elevation of the lower brake disks.
Figure 10:
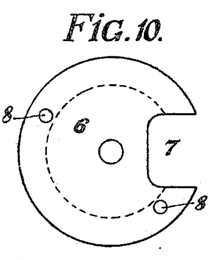
Fig. 10. a plan of the same.
Figure 15:
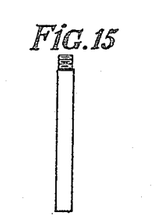
Fig. 15. an elevation of guide rod for lower brake disks.

On the top of the table $a$ is mounted the folding box $r$, into which a "former" $s$ is intermittently passed. The "formers" $s$,—say, four in number,—are made in two parts to slide one upon the other, the lower portion forming a part of an arm fixed to the top brake disk $t$ mounted upon the upper end of the vertical shaft $u$, to which a rotary motion is intermittently imparted by a slotted star wheel $v$ (Figs. 5 and 6) mounted upon the shaft $u$. An intermittent rotary motion is imparted to shaft $u$ from a pin $w$ fixed pendently to the flange $x$ of the barrel $y$ mounted upon the vertical shaft $e$, which is made to engage with the slot $z$ of the wheel $v$. A rising and falling motion is imparted to the shaft $u$ from shaft $f$ by means of cam 1, lever 2 mounted upon the driving shaft $c$, adjustable link 3 attached at one end to lever 2, and at its other end to the lug 4 of collar 5 arranged to slide upon vertical shaft $u$ and to act against the underside of the boss of the star wheel $v$. A second brake disk 6 is mounted loosely on shaft $u$ and is recessed at 7 (Fig. 10). To the brake disk 6 are fixed the pendent guide pins 8 which slide in bosses 9 formed on or fixed to the underside of table $a$. The guide pins 8 retain the brake disk 6 in position. Between the under surface of the brake disk 6 and the locknuts 10,—which work on the screw threaded portion of the shaft $u$,—is mounted what is known as a "Grover" washer 11 (Figs. 11 and 12) for retaining the brake disks $t$ and 6 in frictional contact with each other.

Figure 4:
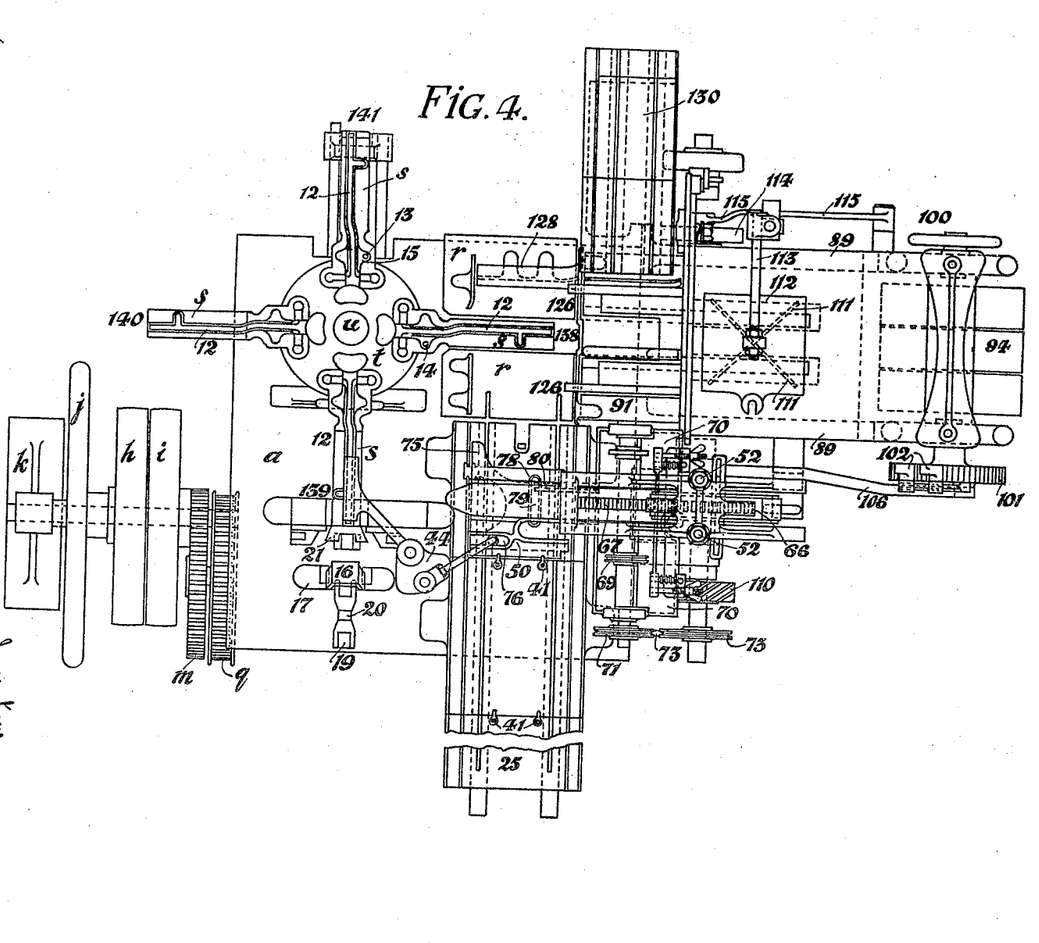
Fig. 4. a plan looking at the top of Fig. 1.

To each top portion of the "formers" $s$ is hinged a lever 12 lined with india rubber on its under surface. The levers 12 are raised by pins 13, 14, (Fig. 4) which respectively act upon lug 15 for raising the said lever for retaining the folded bag around a "former" $s$, and for releasing its hold at the point when the ejector forces the bag from a "former."

Figures 1, 16, 17:
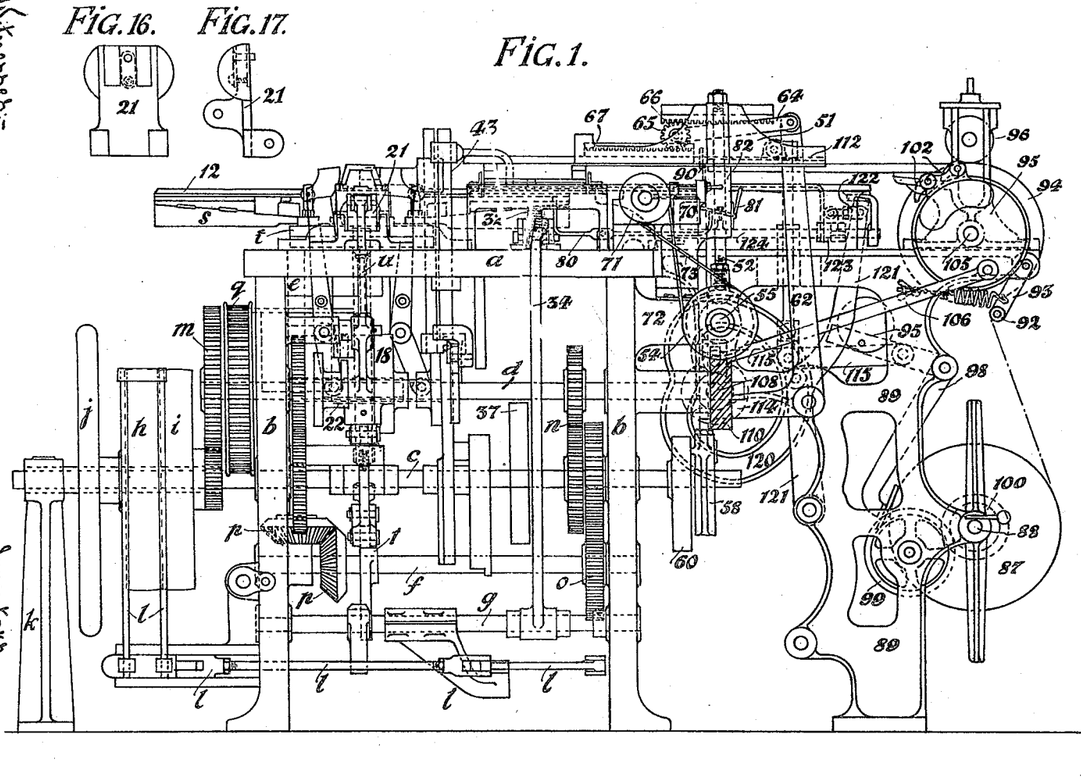
Figure 1. is a front elevation of the entire machine with the improvements forming the subject matter of this invention applied.
Fig. 16. a front elevation of a bottom flap folding piece.
Fig. 17. an end elevation of the same.
Figure 2:
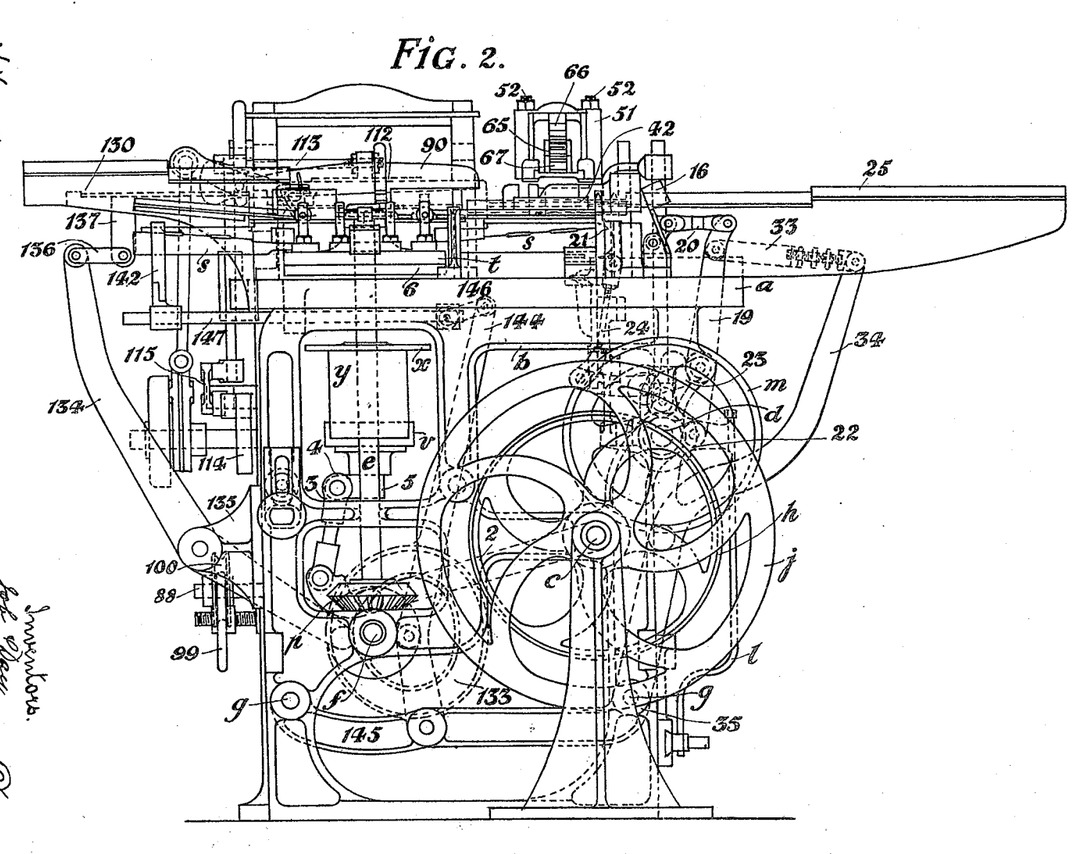
Fig. 2. an elevation of the driving end of the machine.
Figure 3:
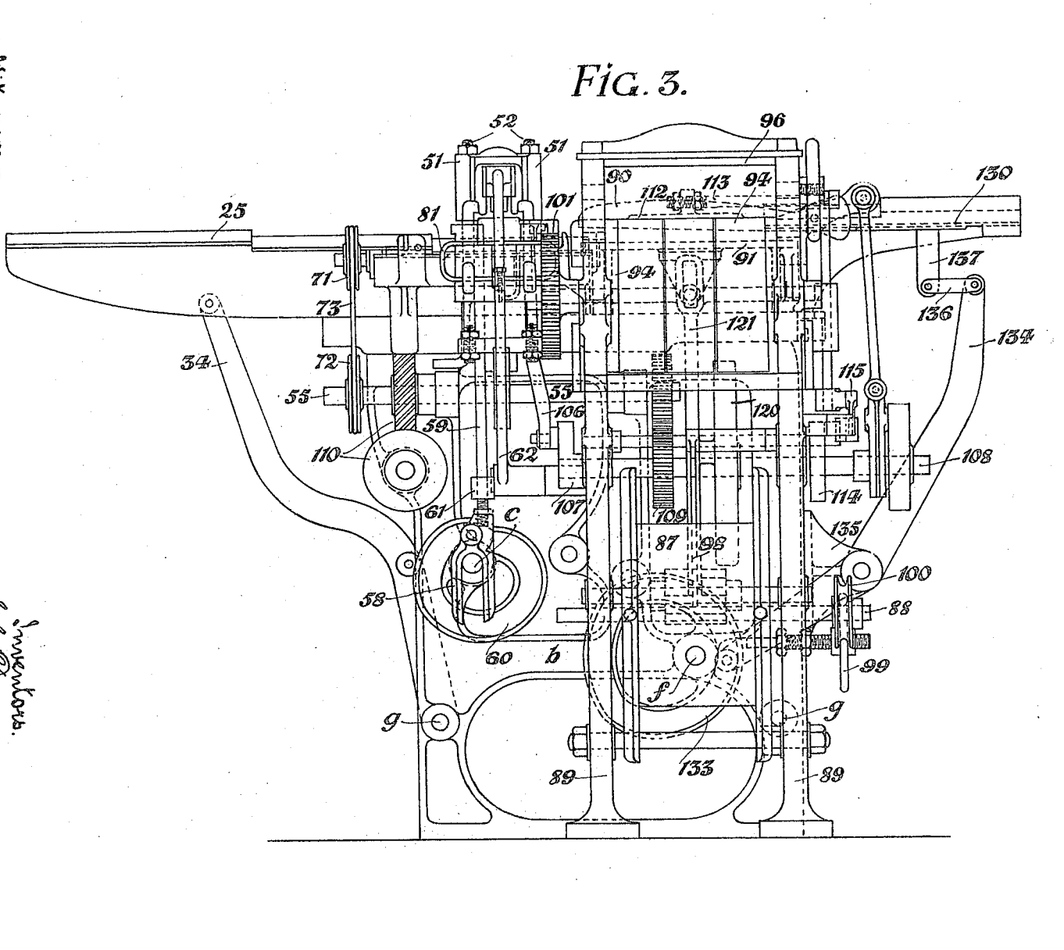
Fig. 3. an elevation of the lining paper feed end of the machine.

16 is the top flap folder jointed to brackets 17 fixed to the table $a$ and operated by cam 18 on shaft $d$ through lever 19 and adjustable link 20. 21 is the bottom flap folder jointed to a bracket fixed to the table $a$ and operated by cam 22 acting upon the link 23 (Fig. 2) and adjustable rod 24. The folders 16 and 21 act against the ends of the "formers." The above named parts are of a similar construction to those usually employed in this class of bag forming machine, and work in a like manner.

Figures 18, 19, 22, 23:
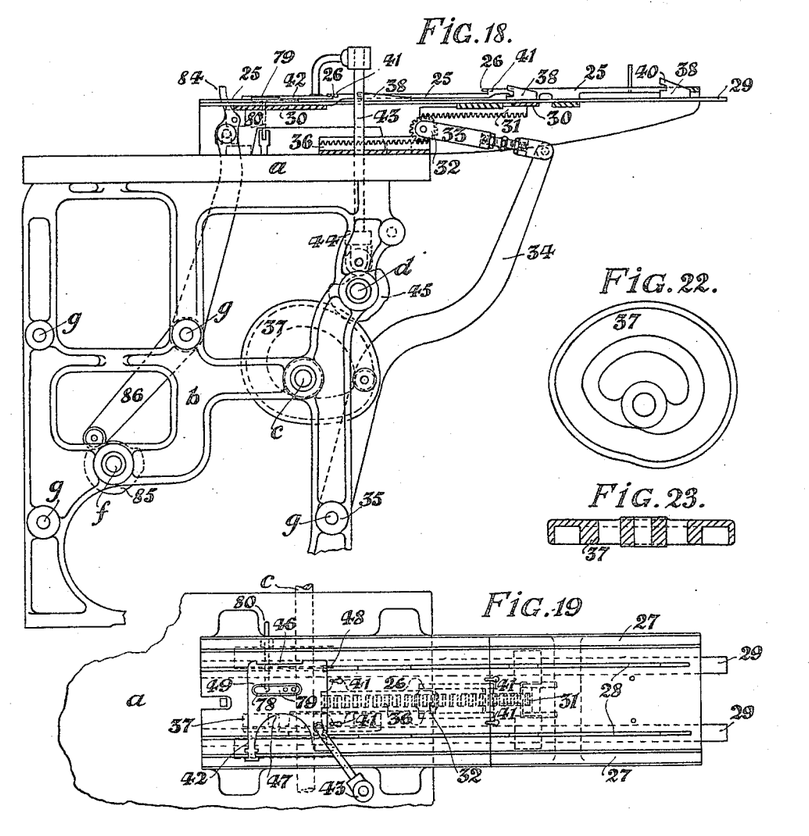
Fig. 18. a part side elevation showing the means for supplying a plain or printed outside sheet of paper to the folding box of the machine.
Fig. 19. a plan of the same.
Fig. 22. an elevation of cam for operating the said slides.
Fig. 23. a sectional plan of same.

25 is a table (Figs. 1 to 4, 18 and 19) which receives the printed or other sheets of paper, or lead, or cardboard,—all of which are hereinafter termed and included in the term "the outside sheet,"—which is employed to form the outside of the bag. The outside sheet is supplied to the folding box $r$ of the machine either in single sheets fed thereto by hand, or by any other suitable automatic arrangement. The just named table is hereafter termed "the conveyer table 25," and it is divided into stepped sections 26 on different levels (Fig. 18). That is to say, instead of making the upper surface of the conveyer table on one level from end to end, its length is divided up into a series of sections, each section being on a different level, so as to prevent an outside sheet being drawn backward by the mechanism that causes it to be propelled along the table. The sides 27 of the conveyer table are made of either angle or T-iron, and they may or may not be let into recesses in the conveyer table where necessary. In the drawings the sides 27 are fixed to the top of the table. One or both of the sides of the table 25 is or are made adjustable if so required. In the stepped portion of the conveyer table is cut one or more grooves, say, for example, two grooves 28 which are continuous throughout the length of the several stepped sections. In each of the grooves 28 is arranged to work a reciprocating bar or slide 29 (Fig. 20). The bars 29 are arranged to work in plate guides 30 fixed to the underside of the conveyer table.

A reciprocating motion is imparted to the bars 29 by means of spur racks 31 fixed to the underside of the center of the said bars and arranged to mesh with a spur pinion 32 mounted in the end of an adjustable link 33 which is attached to the end of lever 34 fulcrumed at 35 on one of the stay rods $g$. The spur pinion 32 also engages with a stationary rack 36 fixed to the table $a$. An oscillating movement is imparted to the lever 34 by cam 37 mounted upon the driving shaft $c$. As the spur pinion 32 is drawn backward and forward by the end of lever 34 and link 33 along the fixed rack 36, a rotary motion is imparted to the pinion, and by its engagement with the rack 31 fixed to the bar 29 an intermittent reciprocating motion is thereby imparted to the latter.

Figure 20:
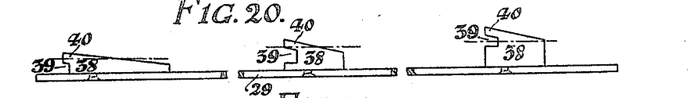
Fig. 20. an elevation of reciprocating bar or slide for conveyer table.
Figure 21:
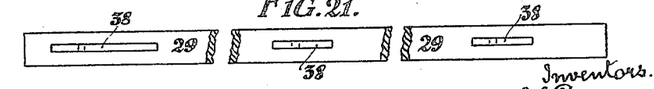
Fig. 21. a plan of the same.

On the upper surfaces of the bars 29 are mounted projections, hereafter termed "pushers 38" (Figs. 20 and 21) of any suitable shape, say, two or more pushers for each section of the conveyer table. The pushers 38 are arranged to project above the level of the stepped portion of each section of the conveyer table 25. The pushers 38 are so constructed that a space 39 is left between the level of the table and the underside of a projecting or overhanging part 40 of each pusher. The overhanging part 40 forms what may be termed a "longitudinal pin" for preventing the outside sheet from rising when being propelled forward by the main portion of the pusher. Any number of pushers, say for example, two, may be provided for each section of the conveyer table, and the pusher is made to taper at its back so as to form at its rear no obstruction to the paper that is to be conveyed to the folding box $r$.

In the vertical portion of each step 26 is also arranged one or more pins 41 (Figs. 18 and 19) for preventing the outside paper returning after being moved forward on to the upper step which is toward the rear of the conveyer table. These last named pins 41 are arranged at a suitable distance apart as well as from the level of the step over which they project. The outside sheet, after it has been carried forward by one set of pushers 38, drops on to the succeeding and lower step 26 into position for being acted upon by the pushers in each step until it has been carried over the folding box $r$ of the machine.

At or near the last or other step of the conveyer table, say, the one nearest to the folding box $r$, is arranged what is termed a "slotted presser plate" 42 (Figs. 18 and 19) which is employed for separating the sheet from the gumming pad. The presser plate 42 is attached to a vertical lifting rod 43 working in bracket 44 fixed to table $a$. The rod 43 receives an intermittent reciprocating motion, say, by a cam 45 mounted upon shaft $d$. The presser plate is also employed for holding the outside sheet in position before the gumming apparatus is brought down upon the same. The plate 42 is recessed at 46, 47, and 48, for gumming purposes, and it is also provided with a slot hole 49 for purposes to be presently described.

Figure 24:
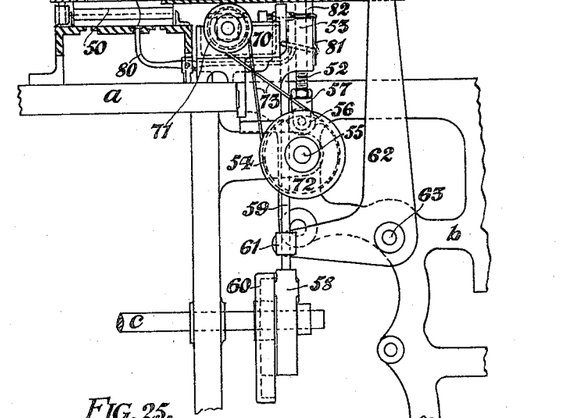
Fig. 24. a part front elevation of gumming apparatus with automatic means applied thereto for throwing the same out of action whenever a sheet fails to be fed into position.
Figure 25:
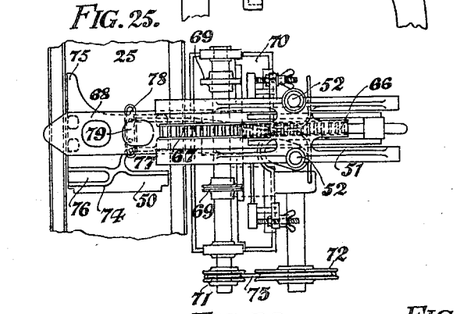
Fig. 25. a plan of the same.

The gummer 50 (Figs. 24 and 25) is made of any required shape for applying the gum or mucilage to the outside sheet to be formed into the bag at a suitable distance from its longitudinal fold. The gummer is mounted in a vertical reciprocating framework 51 carried by the supporting rods 52 which slide in bracket 53 fixed to the table $a$, and the gummer 50 is also arranged so that it can also slide horizontally across the conveyer table 25.

The required motion for first raising the framework 51 before moving the gummer 50 across the table 25 is obtained by means of a cam 54 mounted upon shaft 55. The cam 54 acts upon a runner 56 mounted in a cross bar 57 fixed to the lower ends of the vertical rods 52, thereby raising the framework 51. To carry the gummer 50 across table 25 after the gummer has been raised by cam 54, the forked end 58,—which also acts as a guide,—of a vertical rod 59, is operated by a cam 60 mounted upon the shaft $c$, which passes between the prongs of the forked end 58. To the rod 59 is fixed a boss 61 which is jointed to the shorter arm of a bell-crank lever 62 fulcrumed to stay 63 of the lining sheet framework. The upper end of the bell-crank lever is attached to a link 64 carrying at its outer end a spur pinion 65 arranged to mesh with a rack 66 fixed to the framework 51, and with a second rack 67 fixed to a slide 68 to which the gummer 50 is attached. On motion being imparted to the cam 60, the vertical rod 59 will be raised, and simultaneously motion will be imparted by boss 61,—connected to rod 59,—to the shorter arm of the bell-crank lever 62, causing its upper end to move outward, thereby drawing the link 64 and pinion 65 along rack 67, whereby a rotary motion is imparted to the pinion for causing it, by means of rack 66, to move the slide 68 and gummer 50 attached thereto, inward.

As the gummer 50 moves horizontally inward, it travels over the gum wheels 69,—with plain or grooved peripheries and with or without a covering of india rubber or other suitable material,—mounted on a shaft carried in suitable bearings in the ends of the gum box 70, fixed to the table $a$. A rotary motion is imparted to the gum rollers 69 from shaft 55 by means of pulleys 71, 72, and cross-belt 73. The rollers 69 raise the gum or other liquid mucilage by their peripheries from the box 70 to the portions 74 and 75 of the gummer 50. The portions 74 and 75 respectively gum the outside sheet along one of its longitudinal edges, and also a portion of its surface for attaching a lining sheet to it. The gummer 50 is also recessed at 76, 77, for the passage of the vertical rods 52.

Figure 26:
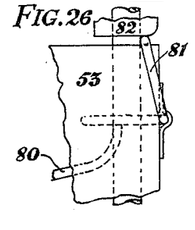
Fig. 26. an enlarged part elevation showing the outer end of the throwing out lever in action.
Figure 27:
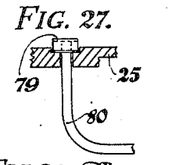
Fig. 27. an enlarged elevation of the inner end of connecting lever which acts upon the operating spring.
Figure 28:
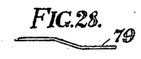
Fig. 28. an enlarged elevation of operating spring.
Figure 29:
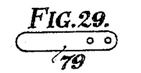
Fig. 29. a plan of same.
Figure 30:
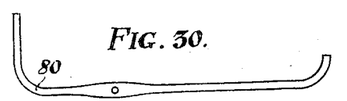
Fig. 30. an enlarged elevation of the connecting lever.
Figure 31:
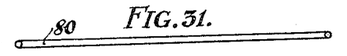
Fig. 31. a plan of the same.
Figure 32:
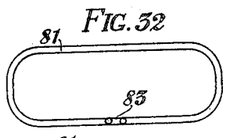
Fig. 32. an enlarged elevation of the throwing out lever.
Figure 33:
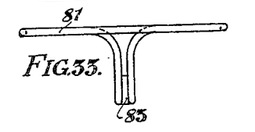
Fig. 33. a plan of the same.
Figures 34, 35:
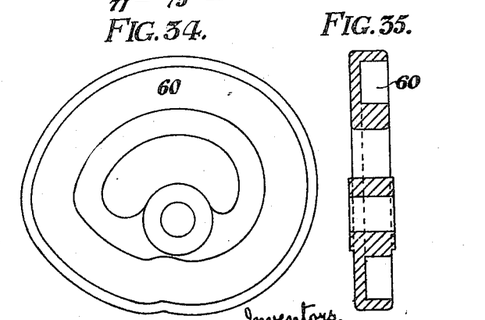
Fig. 34. an enlarged elevation of cam for operating the gumming apparatus.
Fig. 35. a sectional elevation of the same.

On the last section of the stepped conveyer table is formed a longitudinal slot or recess 78 in which is placed and secured a flat bent spring or hinged plate, hereafter termed a "spring finger 79" (Figs. 28 and 29) of any suitable and convenient shape. The free end of the spring finger 79 is made to project above the level of the conveyer table and to act upon a lever 80 (Fig. 30) which is fulcrumed at or about its center to the table $a$ of the machine. The lever 80 works at or about a right angle to the conveyer table 25. The inner end of lever 80 is bent upward, or a spring may be jointed to this end of the said lever if so desired. The lever is also turned up at its outer end, and it is made to engage with or act upon an enlarged loop ended lever 81 jointed to the bracket 53. The lever 81 acts an automatic stop by passing its loop end between the upper side of the bracket 53 and lower surface of a boss 82 on the framework 51, thereby preventing the gummer acting upon the surface of the conveyer table 25 whenever an outside sheet has failed to be delivered thereon. The enlarged loop portion of lever 81 is bent or turned at or about a right angle to the weighted or other part 83 that is acted upon by the outer end of lever 80, as shown at Fig. 26. The spring finger 79 is arranged to pass through the slot 78 in the presser plate 42, and when an outside sheet has been carried over it and the presser plate has descended on to the section of the conveyer table, the pressure of the plate on the outside sheet is sufficient to depress the inner end of lever 80 and to cause its outer end to act upon the automatic stop lever 81 for moving outward and from between brackets 53 and boss 82, so as to allow the gummer 50 to be brought down on to the outside sheet that is on the said table.

In the front of the last section of the conveyer table 25 is jointed a lever or finger 84 (Fig. 18)—jointed to the underside of table 25. The finger is employed for pressing the outside sheet to be gummed against the vertical projection or stop 26 of the section so as to insure of the sheet being gummed in the proper position. The said finger 84 is operated by cam 85, mounted upon shaft $f$, being made to act upon a lever 86 fulcrumed upon a stay $g$. The presser plate 42 also retains the sheet of paper in position during the withdrawal of the gumming apparatus.

Figures 36, 39:
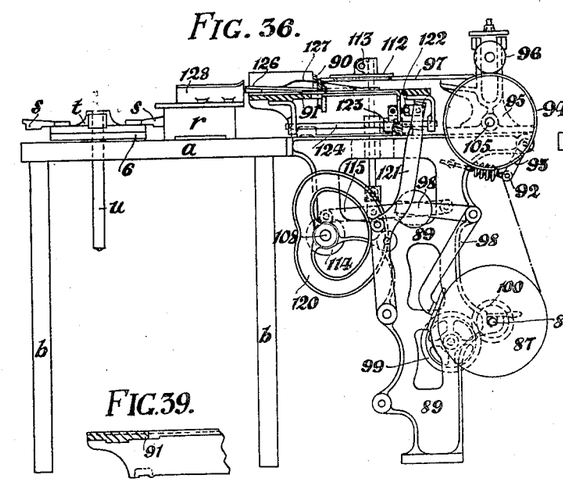
Fig. 36. a part elevation of the mechanism for supplying the lining papers to the folding box, drawn to a slightly reduced scale to Figs. 1 to 4.
Fig. 39. a part elevation of top of the table.
Figure 37:
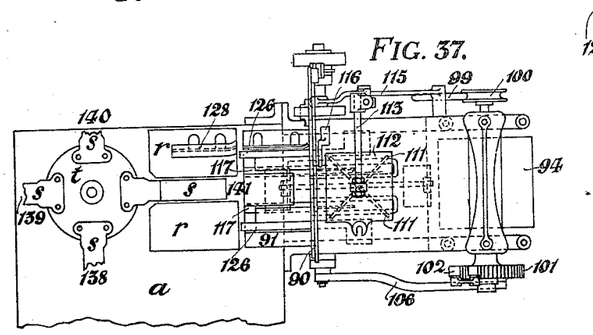
Fig. 37. a plan of the same.
Figure 37A:
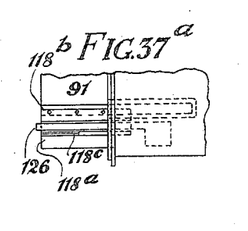
Figure 37B:
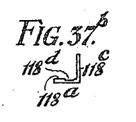
Figure 37C:
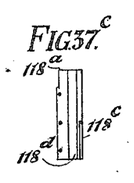
Figure 38:
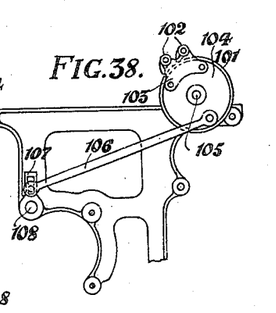
Fig. 38. a part elevation of ratchet feed for the same.

For supplying the inside or lining sheets,—which are slightly smaller in size than the outside sheets,—over the folding box $r$ of the machine, after the outside sheet or covering of the bag has been placed in position, the lining sheets are cut off in lengths from a continuous roll of paper 87,—mounted upon a shaft 88 carried in bearings or framework 89,—by a guillotine 90 placed at the rear of a second table 91 which is arranged at or about a right angle to the conveyer table 25, as shown at Figs. 36 and 37. If desired sheets that have been previously cut to the required size may be used in place of cutting them from a roll. The paper from the roll 87 is carried over spring tensioned roller 92,—mounted in lever 93 fulcrumed to framework 89,—to roller 94 carried in bearings on bracket 95. The required tension is imparted to the paper by means of friction roller 96 also carried by said bracket. Between the roller 94 and the guillotine 90 the paper is made to pass over a flat table 97. A brake 98 consisting of a double ended weighted lever is employed for preventing the paper being drawn off the roll too quickly. The roll 87 is adjusted to the required position by the hand wheel 99 acting upon the grooved wheel 100 mounted upon the paper roller shaft 88. The roll 87 is intermittently rotated for letting off the paper by means of a ratchet wheel 101 (Figs. 37 and 38) by pawls 102 mounted in a carrier 103 fixed to a disk 104 mounted loosely upon shaft 105, upon which roller 94 is mounted. An intermittent oscillating motion is imparted to the disk 104 by a rod 106 attached to crank 107 fixed to shaft 108. A rotary motion is imparted to shaft 108 from shaft 55 by means of spur gearing 109, Fig. 3. The shaft 55 receives a rotary motion from shaft $d$ through skew or spiral gearing 110.

For taking out the curl or for stiffening the lining paper formed from the rolls or sheets, the upper surface of the table 97,—or a wooden or other block to be inserted therein,—is provided with one or more cross shaped or other recesses 111 therein to crease the paper which stiffens it. A plate 112 is provided on its under surface with one or more projections adapted to fit into the recesses in the surface of the table or block therein. The plate is attached to a suitable rod 113 capable of receiving an intermittent vertical reciprocating motion from a cam 114 mounted upon shaft 108. The lower end of rod 113 is attached to a lever 115 fulcrumed to framework 89. After the sheet has been creased, it is raised out of the recesses in the table 97 by any suitable arrangement of flat or other springs 116 fixed to the table. When the creased sheet has been raised from the said recesses it is conveyed to the guillotine knife 90, when used, and then to the folding box $r$ of the machine. The said creasing arrangement is arranged at a suitable distance at the rear of the knife, when such cutting apparatus is used.

Figure 40:
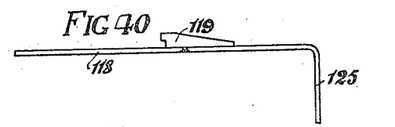
Fig. 40. an elevation of reciprocating feed bar.
Figure 41:
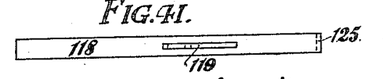
Fig. 41. a plan of same.
Figure 42:
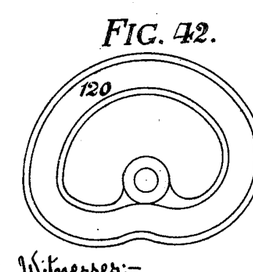
Fig. 42. an elevation of cam for operating the reciprocating bars.
Figure 43:
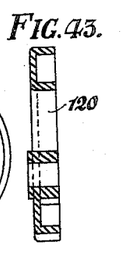
Fig. 43. a sectional elevation of the same.

The table 91 that receives the paper as it is cut to size by and drops from the guillotine 90,—or which receives the sheets of paper that have been previously cut to size,— is provided with one or more longitudinal grooves 117—two grooves are shown in the drawings—in which are made to reciprocate bars or carriers 118 of a similar construction to the bars 29 which work in the sections of the conveyer table 25. The bars 118 (Fig. 40) are provided with similar projections 119 to the pushers 38.

To the bars 118 (Figs. 37$^a$ to 37$^c$) are fixed two brass plates to form guides 118$^a$ and 118$^b$. The guide 118$^a$ is provided with a projection 118$^c$ on its surface for a portion of its length for retaining the lining sheet in position. In the guide 118$^a$ is also formed a groove 118$^d$ for the reception of the spring finger 126.

An intermittent reciprocating motion is imparted to the bars 118 by cam 120 mounted on shaft 108 through lever 121,—fulcrumed to framework 89,—adjustable links 122, sliding cross piece 123—mounted upon the guide rod 124—to which the turned down ends 125 of the bars 118 are secured.

Figures 44, 45, 48:
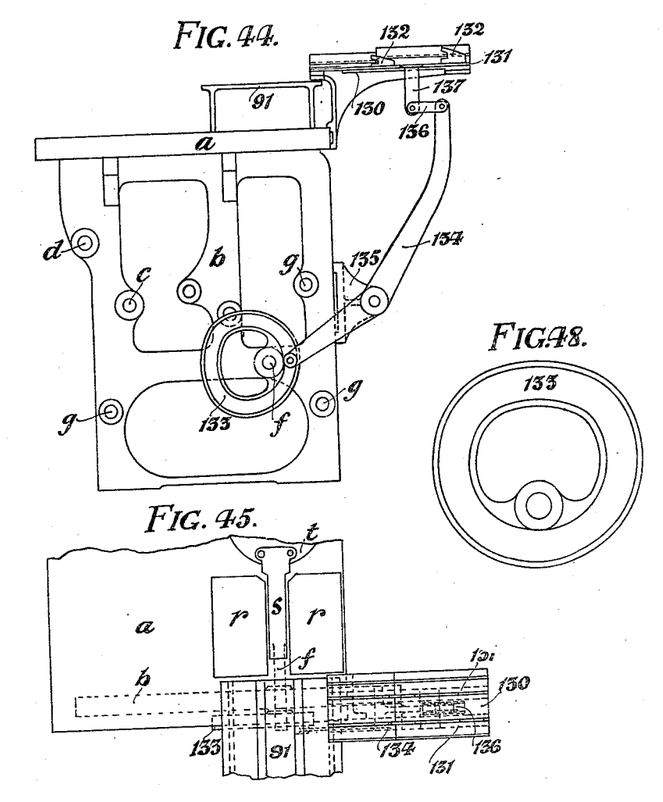
Fig. 44. a part elevation showing apparatus for supplying a lead or intermediate lining to folding box.
Fig. 45. a plan of the same.
Fig. 48. an elevation of the cam for operating the same.
Figure 46:
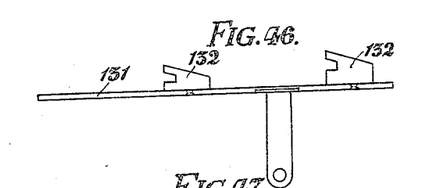
Fig. 46. an elevation of the reciprocating feed bar.
Figure 47:
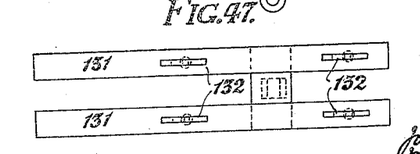
Fig. 47. a plan of the same.
Figure 49:
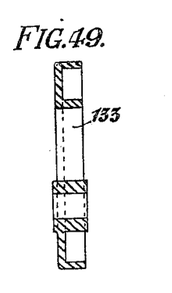
Fig. 49. a sectional elevation of the same.

To the top of the table 91 is fixed one or more, say, two, spring or other fingers 126 with enlarged or turned down ends. The fingers 126 are inclined toward the folding box $r$ and they are employed for retaining the lining sheet in its proper position and at the required distance from the edge of the sheet forming the outer portion of the bag. The enlarged or turned down ends of the stationary spring fingers 126 form a stop for preventing the lining sheet from returning with the bars 118 and their projecting pushers 119 when the bars are withdrawn within the table 91 from the folding box or mold of the machine after a lining sheet has passed over the fingers. The spring or other fingers may or may not have projections on or be grooved as required. A spring finger 127 is fixed to the knife 90 and it is employed for keeping the lining sheet down in position after it has been cut off by the guillotine. As the lining sheet is carried over the fingers 126 by the bars 118 and pushers 119, it is passed into the guide 128 fixed to the top of the folding box $r$. When it is desired to insert a second or intermediate lining, say, of lead paper, hereinafter termed the "intermediate lining sheet," a third conveyer table 130 is employed (Figs. 44 and 45) which is of a similar construction to that shown and described for the outside sheet, only in this instance it is provided with one step. In the table are formed two longitudinal grooves in which are made to slide the bars 131 provided with projections 132. The bars and their projections are of a similar construction to the bars 29 and pushers 38. An intermittent reciprocating motion is imparted to the bars 131 and projections 132 by a cam 133 mounted upon shaft $f$ through lever 134,—fulcrumed to bracket 135 fixed to the framework $b$,—link 136 connected to the pendent bar 137, to the upper end of which the bars 131 are fixed. The table 130 is fixed to table $a$, but on one side of table 91, so that the intermediate lining is first delivered on to the last named table prior to the lining sheet being deposited thereon. Both the intermediate and the lining sheets are afterward carried together over the folding box $r$ by bars 118 and pushers 119 and deposited upon the outside sheet which has previously been carried and deposited over the folding box by the bars 29 and pushers 38. The sheets are then in a position to be acted upon by the "formers" $s$, that is to say, at point 141 the sheets are wrapped around a "former" $s$ in the folding box $r$. Afterward the "formers" are raised and rotated to position 138 where the ends of the bag are formed and folded. The "formers" are then again raised and rotated to position 139 where the ends of the bag are wiped prior to the "formers" being raised and rotated to position 140 for being ejected from the "former" by the forked ejector 142 which is actuated by cam 143 mounted on shaft $f$ through lever 144 fulcrumed to a cross bar 145 fixed to the stays $g$. The upper end of lever 144 is attached by link 146 to a sliding bar 147,—carried in bearings 148 on the underside of the table $a$,—fixed to the ejector 142.

The action of the apparatus is as follows:—A sheet of paper having been placed upon the conveyer table 25, it is moved along its stepped surface by bars 29 and pushers 38 until it is brought under the separator plate 42, where it is held in a position for being acted upon by the gummer 50. After the outside sheet has been gummed it is then passed over the folding box $r$. Simultaneously with this movement of the outer sheet taking place, the lining sheet, with or without an intermediate lining of lead paper, is first cut off the roll of paper, straightened by being passed under the creaser plate 112, when it is passed on to the top of the folding box over the outside sheet, to be there acted upon by the "former" which first carries the sheets of paper into the box, and the sheets of paper are afterward caused to be wrapped around the "formers" and the gummed portions of the outer part secured together by being brought under the flap 12. The ends of the bags are then successively creased, formed, and folded, as the "formers" pass respectively into the positions 138, 139, and 140. From the latter position it is ejected from the "former."

We claim:—

1. In a paper bag forming machine, the combination of the table of the machine having a folding box thereon, of a conveyer table fixed transversely upon the table of the machine, said conveyer table being provided with projecting sides and divided into stepped sections of different levels, and having a pair of parallel and continuous grooves therein, a pair of bars reciprocating respectively in said grooves, a pair of projecting pushers for each stepped section fixed respectively to each of the said bars, each pair of pushers being of a different height to suit its section and inclined on their tops and recessed at their front portions and means for intermittently reciprocating the said bars and the pushers of each of the said sections simultaneously, and a projection fixed to the vertical portion of each step of the conveyer table for preventing a sheet of paper returning with the bars and pushers.

2. The combination of the table of the machine having a folding box fixed thereon and a conveyer table fixed transversely upon the table of the machine, said conveyer table being provided with projecting sides and divided into stepped sections of different levels and having a pair of parallel and continuous grooves therein, a pair of bars reciprocating respectively in the said grooves, a pair of projecting pushers for each section fixed respectively to each of the said bars, each pair of pushers being of a different height to suit its stepped section and inclined on their tops and recessed at their front portions, and means for intermittently reciprocating the said bars and pushers of each section simultaneously, a projection fixed to the vertical portion of each step of the conveyer table for preventing a sheet of paper returning with the bars and pushers, a lever jointed to the end of the conveyer table for pressing the sheets of paper backward, means for intermittently moving the last named lever in and out of position, a perforated plate arranged over a section of the conveyer table for clamping the paper down on to the surface of the said table, a vertical rod upon which the said clamping plate is mounted, means for intermittently reciprocating the said plate and its vertical rod and a stop for preventing the perforated plate coming in contact with the table when no sheet of paper is in position.

3. The combination of the table of the machine having a folding box fixed thereon and a conveyer table fixed transversely upon the table of the machine, said conveyer table being provided with projecting sides and divided into stepped sections of different levels and having a pair of parallel and continuous grooves therein, a pair of bars reciprocating respectively in the said grooves, a pair of projecting pushers for each section fixed respectively to each of the said bars, each pair of pushers being of a different height to suit its stepped section and inclined on their tops and recessed at their front portions, and means for intermittently reciprocating the said bars and pushers of each section simultaneously, a projection fixed to the vertical portion of each step of the conveyer table for preventing a sheet of paper returning with the bars and pushers, a spring working in a slot in the conveyer table, a gum box fixed upon the first named table on one side of the conveyer table, rollers rotating in the gum box and means for rotating the same, framework made to rise and fall, gumming apparatus mounted upon the said framework so as to be capable of being horizontally reciprocated over the gum box and its rollers and the slotted plates, means for operating the gumming apparatus and stop mechanism for preventing the gummer coming in contact with the table when no sheet of paper is in position.

4. The combination of the table of the machine, a stepped grooved and slotted conveyer table, bars provided with projecting pushers reciprocating therein and means for intermittently reciprocating the same, horizontal projections fixed to the steps of the conveyer table, for preventing the return of a sheet to the preceding step, a spring fixed in the slot of the conveyer table, a slotted plate for pressing the sheet on to the table and thereby depressing said spring, means for causing the said plate to intermittently rise and fall, a gum box mounted on the table of the machine, rollers revolving in said gum box, means for rotating said rollers, a horizontally reciprocated slide, a gummer mounted in said slide, a rising and falling carrier in which said gummer slide is mounted, means for intermittently reciprocating the gummer slide and causing its carrier to rise and fall, a lever fulcrumed to the underside of the machine, said lever being bent at one end to engage with said spring, a weighted loop lever jointed to its opposite end to form a stop for preventing the gummer coming in contact with the table when there is no sheet in position to be gummed, as set forth.

5. The combination with the table of the machine and with a stepped conveyer table provided with means for conveying a sheet from step to step, of a flat spring fixed in a central opening in the conveyer table, a rising and falling conveyer, a slotted plate fixed to said carrier for holding a sheet in position for acting upon said spring, means for operating the said carrier, a double ended lever fulcrumed to the table of the machine belt at one end to engage with the said spring, and a weighted looped stop lever jointed to the end spring.

6. The combination with the table of the machine and with a stepped and recessed table provided with reciprocating bars and pushers and means for actuating the same, a roll of paper and means for braking and rotating the same, of a pair of rollers for drawing the paper forward, a creaser plate mounted in a vertical reciprocating carrier and provided with projections for pressing the paper into the recesses of the table, means for actuating the creaser plate, and raising the paper out of the said recesses, a guillotine for cutting off lengths of paper from the roll, means for operating the guillotine, a spring fixed to the guillotine for retaining the cut sheet in position, and guides provided with projections and spring fingers, said guides being fixed to the reciprocating bars, as set forth.

7. The combination of the stepped and recessed table provided with reciprocating bars and pushers, and means for actuating the same, of a creaser plate mounted in a vertical reciprocating carrier and provided with projections for pressing the paper into the table, means for operating said creaser plate and guides provided with projections and spring fingers, said guides being fixed to the reciprocating bars, as set forth.

8. The combination with the table of the machine mounted upon framework and having a folding box mounted thereon, a stepped, grooved, and perforated conveyer table provided with means for conveying the outside sheet to the folding box, a series of rising and falling "formers" and means for intermittingly rotating the same, each of said "formers" being diagonally divided a second stepped table arranged at a right angle to the conveyer table and provided with means for cutting off a sheet of paper from a roll and creasing it and conveying it to the folding box, and a third stepped table arranged opposite to the conveyer table and provided with means for conveying a second lining sheet to and depositing it upon the folding box, a gum box mounted on the framework of the machine having rollers rotating therein and means for actuating the same, a rising and falling carrier, a gummer fixed to a horizontally reciprocating slide mounted in said rising and falling carrier and means for operating the same, a rising and falling clamping carrier, a slotted plate fixed to said last named rising and falling carrier over the conveyer table for clamping the outside sheet down on to the table, a spring fixed in a recess in the conveyer table, a double ended lever fulcrumed to the underside of the table of the machine and bent at one end to engage with said spring, and a stop jointed to the other end of the lever for preventing the gummer being brought into contact with the table when there is no sheet in position to be gummed.

JOB DAY.
 WILLIAM HENRY DAY.
 CHARLES HERBERT DAY.
 ALBERT DAY.

Witnesses:
 LEWIS DEXTER,
 C. E. TAYLOR.